United States Patent [19]
Dismuke, Jr. et al.

[11] Patent Number: 5,632,116
[45] Date of Patent: May 27, 1997

[54] APPARATUS AND METHOD FOR RECOVERY OF COTTONSEED FROM LINT

[75] Inventors: Charles R. Dismuke, Jr., Greenville, Miss.; Robert F. Motley, Arizona City; Donald L. Brubaker, Eloy, both of Ariz.

[73] Assignee: Delta and Pine Land Company, Scott, Miss.

[21] Appl. No.: 401,249

[22] Filed: Mar. 9, 1995

[51] Int. Cl.$^6$ .................................................. A01C 1/00
[52] U.S. Cl. .................................................. 47/58
[58] Field of Search .......................... 47/58, 5, DIG. 9; 19/40, 41, 42

[56] References Cited

U.S. PATENT DOCUMENTS

| | | | |
|---|---|---|---|
| 299,378 | 5/1884 | Green | 19/40 X |
| 1,425,688 | 8/1922 | Polhamus | 47/58 |
| 1,718,332 | 6/1929 | Cloer | 47/DIG. 9 |
| 2,308,883 | 1/1943 | Kettenbach | 47/58 |
| 2,618,103 | 11/1952 | Streets | 47/5 X |
| 2,735,226 | 2/1956 | Franks et al. | 47/5 X |
| 4,055,680 | 10/1977 | Duke | 47/58 |
| 4,154,021 | 5/1979 | Griffith et al. | 47/58 |
| 5,423,107 | 6/1995 | Thrash | 19/40 |

*Primary Examiner*—James R. Feyrer
*Attorney, Agent, or Firm*—Rothwell, Figg, Ernst & Kurz

[57] ABSTRACT

Apparatus and method for delinting cottonseed using hydrogen chloride gas derived from hydrogen chloride stored at high pressure. The hydrogen chloride gas is expanded and reduced to a pressure in the range of but above atmospheric pressure, then heated in a heat exchanger, passed through a flow meter for regulating the flow rate and controlling the amount hydrogen gas introduced for processing a batch of fuzzy cottonseed, and then introduced into a rotating drum reaction chamber along with a measured quantity of fuzzy seed to be delinted. The expansion process and heat exchange processes are controlled to produce a gas pressure and temperature range at the inlet to the drum reaction chamber which substantially increases yields over the prior art systems, provides substantially complete absorption of the gas by the seed thereby avoiding gas leakage from the system when the treated seed is removed from the reaction chamber and further avoids the need for further treatment of the seed with anhydrous ammonia.

8 Claims, 3 Drawing Sheets

APPARATUS AND METHOD FOR RECOVERY OF COTTONSEED FROM LINT

The present invention relates to apparatus and methods for the recovery of cottonseed from the lint and, more particularly, to apparatus and methods utilizing hydrogen chloride gas for the removal of lint from the seed.

BACKGROUND

It is a common practice in the art to recover cottonseed from the lint which remains after the cotton product itself is separated from the crop. The seeds so recovered are used for the production of cottonseed oil and for planting purposes.

One of the methods commonly employed for the removal of lint from cottonseed is the hydrogen chloride gas method known as the anhydrous hydrogen chloride gas method. This method involves injecting HCl gas into a closed reaction chamber which contains a charge of fuzzy seed. The HCl gas reacts with the lint on the seed and the seed is then emptied from the reaction chamber into a buffer. In the buffer, the lint is buffed from the seed by means of rotating screens.

A typical prior art apparatus for carrying out the hydrochloric gas method is shown in the schematic block diagrams of FIGS. 1 and 2. In the prior art apparatus shown in FIG. 1, hydrogen chloride is stored under pressure in liquid form and taken off under pressure in gaseous form from an HCl trailer 10, which is positioned outside the building in which the delinting process is carried out, through copper tubing 12 until the gas reaches the building and then through pipes 20 within the building itself. The pipes 20 are typically what is known in the art as "Schedule 40 black pipe", which is a steel pipe having a "Schedule 40" thickness. The HCl is stored in the trailer 10 under a pressure in the range of about 500 to 700 pounds per square inch (psi) and typically is in liquid form as stored, with a portion of the storage volume not occupied by the liquid being occupied by HCl in gaseous form. The HCl may thus be taken off either in liquid or gaseous form but is taken off in gaseous form in the typical prior art system.

As the HCl gas is removed from the trailer 10, it is carried through the copper tubing 12 and then through the pipes 20 through an electrically actuated ball valve 14 to a heat exchanger 18. The HCl gas is expanded through the electrically actuated ball valve 14 and then introduced into the heat exchanger 18 and, in the process of this first expansion, the temperature is reduced to the range of about –200° F. before the gas enters the heat exchanger. The heat exchanger 18 typically uses heated oil as the heat exchange medium. The HCl gas is circulated through heat exchange coils within the heat exchanger. The temperature of the oil in the heat exchanger 18 is typically maintained at about 150° F. with the purpose of warming the HCl gas to above the water freezing temperature of 32° F.

After the HCl gas passes through the heat exchanger 18, it is carried through Schedule 40 black pipe 20 through a regulating check valve 16 and a flow meter 22 and into a revolving delinting drum 24. The flow meter 22 is typically an orifice type element which produces a pressure drop proportional to the flow rate of the HCl gas through the orifice. This pressure drop is sensed and is used to control the regulating check valve 16 to regulate the flow rate of the HCl gas at a selected level through the system.

Thus, as the tubes of HCl in the HCl trailer are individually accessed, the pressure in each tube is reduced as the gas is withdrawn from the tube and the flow meter 22 indicates the manual adjustments needed for the regulating check valve 16 to maintain the desired flow rate. The desired flow rate is thus maintained until the full charge of HCl gas is delivered for treating a batch of fuzzy seed in the revolving delinting drum 24. After the fuzzy seed is treated with the HCl gas in the revolving drum 24, the seed is removed for further processing as will now be explained.

The delivery and processing of the fuzzy seed is shown in the flow chart of FIG. 2. The fuzzy seed to be delinted is initially stored in a hopper feeder 26 and is delivered, typically by an auger (not shown), through an elevator 28 into a dryer drum 30. The seed is preheated in the dryer drum 30 to about 140° F. After removal from the dryer drum 30, the fuzzy seed is conveyed by an elevator 32 to a charge cart where the seed is weighed out in the proper batch size, typically in a batch size of about 2,000 to 2,500 pounds.

The charge cart 34 is typically a wheeled vehicle powered by an electric drive which, after measurement of the proper batch amount, injects the seed into the revolving delinting drum 24 bypassing a boot pit 36 in the process. The HCl gas for treating the fuzzy seed injected into the revolving delinting drum 24 is introduced by means of the gas flow control system of FIG. 1. During the treatment of the seed with HCl gas the temperature of the delinting drum 24 itself is maintained at a constant temperature of about 145° F. by an external heater (not shown). The 145° F. temperature level also serves to eliminate any pink boll worm and other infestations which may be present in the fuzzy seed.

After the fuzzy seed is treated with the HCl gas in the delinting drum 24, the drum 24 is tilted at an angle and the seed is dumped into the boot pit 36 from where it is conveyed by an elevator 38 to buffing reels 40 and then by an elevator 42 to a clipper cleaner 44. The buffing reels 40 remove by mechanical action the fibers which have been weakened by the HCl treatment and the clipper cleaner 44 removes foreign material, small seeds and cracked seed particles.

In prior art HCl systems of the type shown in FIGS. 1 and 2, the typical amount of HCl gas used to treat the fuzzy seed is in the range of about 12 to 13.6 pounds of HCl gas per ton of fuzzy seed depending upon the variety of the seed, the moisture content of the seed, the amount of lint on the seed and other such factors. Some portions of the seed treated in such prior art systems typically exhibit damage which has been thought to be heat damage due perhaps to overheating of some of the HCL gas or to hot spots within the drum during treatment. It was also suspected that such overheating may have affected the overall yields of the system in terms of gas use per ton of seed treated.

In addition, in such prior art systems it was found that when the delinting drum 24 is opened for removal of the seed after treatment of the seed with HCl gas, some HCl gas is released indicating that gas remains which has not reacted with the seed. HCl gas which escapes from the system combines with moisture in the atmosphere to form hydrochloric acid. The escaping HCl gas is thus not only requires that workers operating the system wear protective equipment but is also causes corrosion of the plant equipment and creates maintenance problems.

In addition, in such prior art systems, the pH of the seed as it is removed from the delinting drum (after a processing time in the drum of about 10 to 12 minutes) is about 2.8 and anhydrous ammonia ($NH_3$) is therefore used to neutralize the seed and the lint, thereby adding to the cost of treating the seed. After treatment with $NH_3$, the pH of the seed is about 4.0 to 4.2 and the pH of the lint is about 2.2. In such prior art systems, about 7.8 to 9.0 pounds of $NH_3$ is used per ton of seed processed.

Further, leakage problems have been encountered in such prior art systems. Because of the problem of leakage of HCl gas from the prior art systems, such systems have been operated only in arid climates in order to avoid the combination of the HCl gas with water to form hydrochloric acid and the resultant hazards and corrosion problems which would result. Nevertheless, because of the leakage of HCl gas which does occur, serious corrosion problems causing frequent maintenance of the equipment have been encountered with such prior art systems even in arid climates.

In addition, when maintenance is required, the system must usually be opened and, in that process, some residual HCl gas which is present in the system is unavoidably released, thus causing further leakage and problems similar to those encountered when the drum 24 is opened after a run.

SUMMARY OF THE INVENTION

In view of the foregoing problems of prior art HCl delinting systems, it is an object of the present invention to provide a substantially improved HCl delinting system with greatly increased yields and in which problems associated with escaping HCl gas are substantially alleviated and virtually eliminated in some respects.

Although it has been suspected by workers in the prior art that seed damage has been caused by high temperatures of the HCl gas injected into the delinting drum 24, it has been discovered by the present inventors that in such prior art systems the further expansion of the HCl gas through the check valve 16 and the orifice of the flow meter 22 after leaving the heat exchanger 18 causes a further drop in the temperature of the HCl gas before it is injected into the delinting drum 24. The present inventors have further discovered that this additional and heretofore unknown temperature drop has resulted in the injection of supercooled HCl gas, at temperatures often well below 32° F., into the delinting drum 24 with the result that some of the seed has been damaged by the extreme cold temperatures of the HCl gas rather than by high temperatures as has been previously suspected.

It has also been found that these low temperatures of the HCl gas injected into the delinting drum 24 have impeded the reaction of the HCl gas with the lint on the fuzzy seed and have thereby not only very substantially reduced the yield of the delinted seed in relation to the amount of gas used but also have resulted in substantial amounts of unreacted and residual gas left over at the end of the run such that the gas is expelled from the system when the delinting drum is opened.

The method and apparatus of the present invention provide substantial improvements in the HCl delivery system over the prior art systems and are capable of regulating the HCl expansion, heating and other process conditions such that the gas enters the delinting drum at a substantially increased temperature above that attained in prior art systems, typically in the range of or below the drum temperature of from about 140° F. to 145° F. and preferably with a gas temperature in the range of about 70° F. to about 125° F.

As a result in the increase in the temperature of the HCl gas entering the delinting drum, it has been found that the reaction efficiency of the HCl treatment of the fuzzy seed has been greatly improved and that the yield of seed per pound of HCl used has been nearly doubled. In addition, the greatly improved reaction efficiency has resulted in more complete use of the resident HCl gas such that virtually no HCl gas remains when the delinting drum is opened at the completion of the HCl cycle to remove the seed from the drum. The yield is therefore not only approximately doubled but also, because the reaction is more complete and excess gas has not been absorbed by the fuzzy seed, there is no requirement for treating either the lint or the seed with $NH_3$ to balance the pH upon removal of the seed from the delinting drum.

The apparatus and method of the present invention further provide means for purging the system at selective locations such that maintenance can be performed without the risk of escaping HCl gas. In addition, the piping of the system has been improved to greatly reduce leakage from the system below that encountered in prior art systems. Overall maintenance costs of the system are therefore greatly reduced and the need for protective equipment for the operation of the system is substantially reduced and in some cases entirely eliminated.

Further detailed description of a preferred embodiment of the present invention along other advantages thereof are presented below with reference to the accompanying drawings.

DETAILED DESCRIPTION OF THE INVENTION

Figure 3:
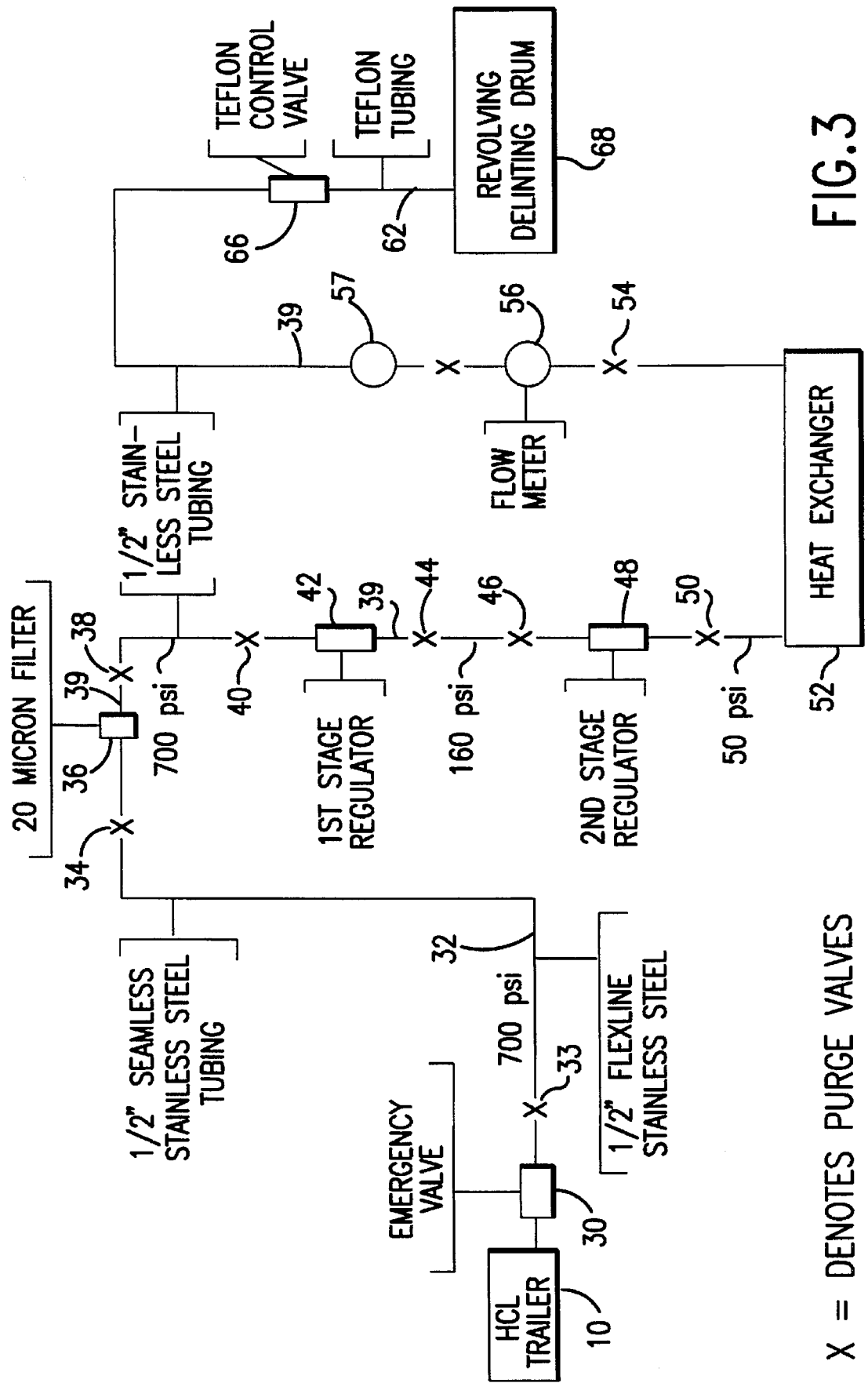
FIG. 3 is a block diagram and flow chart of one embodiment of the HCl cottonseed delinting apparatus and method of the present invention.

Referring to the embodiment of the present invention as shown in FIG. 3, HCl gas is delivered to the system in liquid form under pressure by means of an HCl trailer 10 as in prior art systems. The HCl is removed in gaseous form from the trailer 10 through an emergency valve 30 into ½" flexline (flexible) seamless stainless steel tubing 32 at a pressure which may range from about 200 psi up to about 700 psi. In the embodiment of FIG. 3, the tubing 32 is rated to withstand a pressure of 1400 psi. The emergency valve 30 is a safety shut-off valve that is manually controlled in the event of detection of leakage in the system or automatically controlled in the event of a power failure. The emergency valve 30 is activated in a manner which is well known to those skilled in the art.

The HCl gas next flows through a purge valve 34 which can be opened to connect the interior of the tubing 32 to the exterior of the system to allow purging of the gas as well as moisture from within the tubing 32 by extracting the gas and moisture from within the tubing into an exterior closed container. In normal operation, the vent opening of the purge valve 34 to the exterior of the system is closed and sealed to prevent any leakage of the gas from the interior of the system. The function of the purge valve 34 and others like it will be explained in further detail later in the specification.

After passing through the purge valve 34, the HCl gas flows through a filter 36, which is preferably about a 20 micron filter. The filter 36 removes small particulates from the HCl gas stream and reduces clogging within the system downstream of the filter thereby reducing maintenance problems with the equipment.

After leaving the filter 36, the HCl gas stream passes through stainless steel tubing 39 and two more purge valves 38 and 40 and through a first stage regulator 42, thence through purge valves 44 and 46 and into a second stage regulator 48. The first stage regulator 42 operates to expand and reduce the pressure of the HCl stream down to about 160 psi and the second stage regulator 48 then operates to further reduce the pressure of the HCl stream from about 160 psi to a pressure of from about 35 to about 50 psi at the outlet side of the second stage regulator 48. Therefore, the gas stream is fully expanded down to a pressure in the vicinity of normal atmospheric pressure or slightly higher by the first and second stage regulators 42 and 48 and the temperature of the gas stream is reduced at this point in the system by the full amount that is associated with such expansion and such pressure reduction. At this point, the HCL gas is substantially fully expanded to a preferred pressure range of from about 35 psi to about 50 psi as it exits the second stage regulator 48. In a preferred embodiment, the first stage regulator is formed of a pair of separate regulator valve units connected in parallel with each other for split flow operation. The characteristics of the parallel-connected valve units are balanced such that the flow is evenly divided between the valve units.

After then passing through another purge valve 50, the gas stream then enters a heat exchanger 52. The heat exchanger uses hot oil, preferably controlled to a temperature of from about 170° F. to about 180° F., as the heat exchange medium and is set to increase the temperature of the gas stream after the temperature has been reduced by expansion through the first and second stage regulators 42 and 48 to a temperature at least substantially above 32° F., at which icing would occur, and preferably in the range of from about 40° F. to about 125° F.

The gas stream then passes through another purge valve 54 and the flow rate of the gas stream as it exits the heat exchanger 52 is measured by the flow meter 56. The flow meter 56 is of a type which does not require substantial further pressure reduction of the gas stream and there is therefore no substantial temperature reduction experienced in the gas stream by reason of the measurement of the flow by flow meter 56. An important feature of the present invention is maintaining the temperature of the heated gaseous HCl at an elevated level at the point of introduction thereof into the delinting drum. In the embodiment of FIG. 3, this is attained by the substantially complete expansion of the HCl gas prior to increasing the temperature thereof in the heat exchanger 52, and the introduction of the heated HCl gas without further substantial expansion thereof such as would cause a further substantial temperature drop prior to the later introduction of the HCl gas into the delinting drum.

Figure 1:
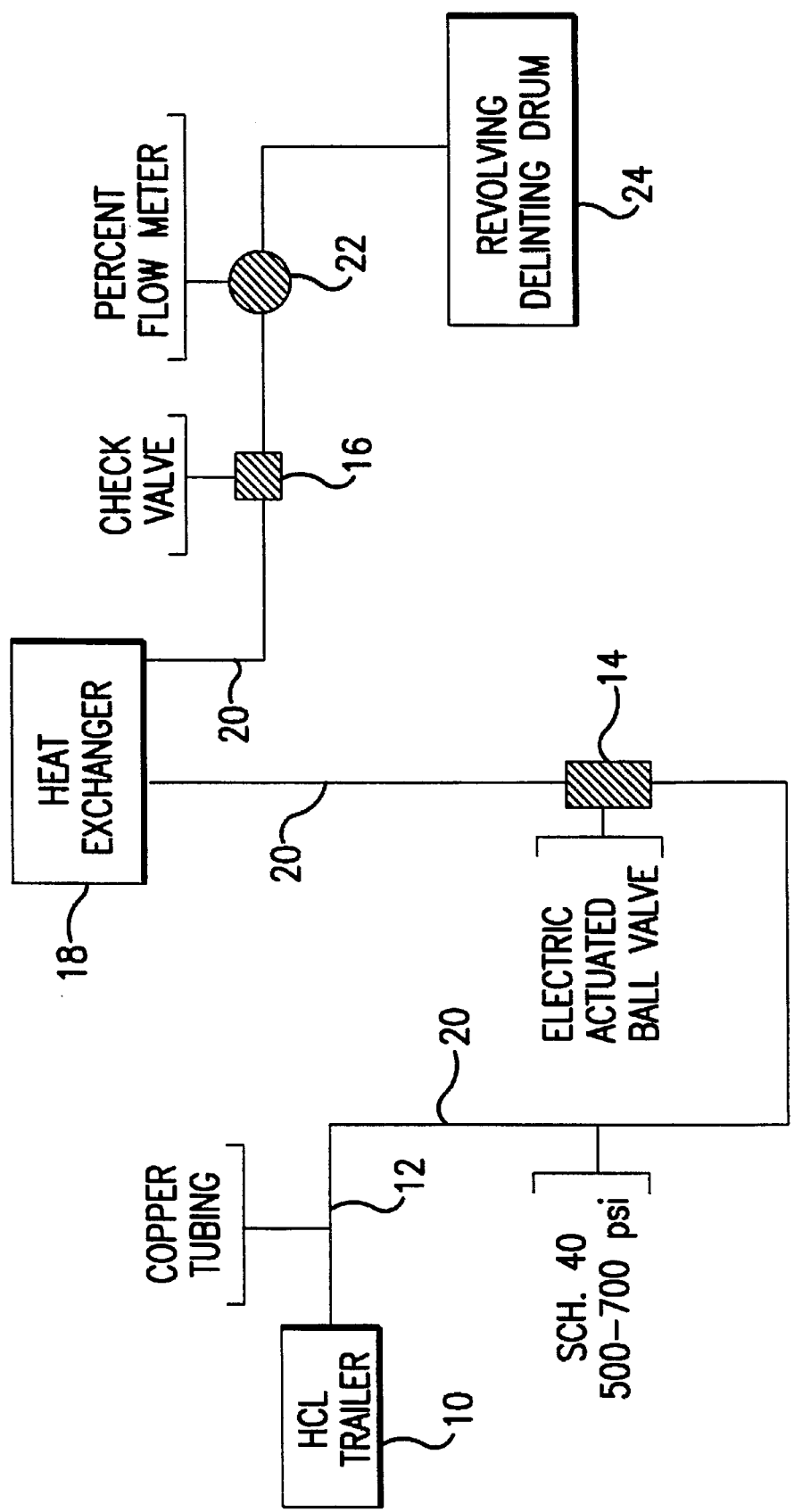
FIG. 1 is a block diagram of a prior art HCl delivery system for controlling the flow of HCl to a revolving delinting drum in a prior art HCl cottonseed delinting system.

The flow meter 56 is a float type or bulb type of instrument instead of the orifice type flow meter 22 as used in the prior art of FIG. 1. In the embodiment of FIG. 3, the flow meter 56 is a Fluroware Accu.Tek model number FM-8N-13250-1, manufactured and sold by the Fluroware Company. The flow meter 56 operates by sensing the flow rate of the gas flowing through the open pipe without using an expansion orifice which would otherwise cause a substantial further drop in pressure and a resultant drop in the temperature of the HCl gas. An in-line thermometer 57 is connected in line 39 downstream of the flow meter 56 to enable measurements of the gas temperature at this point.

The tubing 39 in the system at this point is all seamless stainless steel tubing. The trailer 10, emergency valve 30 and filter 36 in the embodiment of FIG. 3 are located exterior of the building which houses the remainder of the equipment.

The transition from the exterior to the interior of the building which houses the remainder of the equipment is made from filter 36 to the seamless stainless steel tubing 39. Transition is made from the seamless stainless steel tubing 39 to Teflon type tubing 62 at control valve 66.

Within the building, the gas stream passes through a Teflon control valve 66, Teflon tubing 62 and into a reaction chamber which, in the embodiment of FIG. 3, is in the form of a revolving delinting drum 68 which is the same in function as the delinting drum 24 of the prior art system of FIG. 1. The HCl gas decreases in temperature slightly as it flows through the piping of the system and, for the embodiment of FIG. 3, enters the delinting drum 68 at a temperature in the range of from about 70° F. to about 125° F. The inventors have found that substantial benefits of the present invention are obtained if the gas enters the delinting drum 68 at a temperature which substantially above freezing, that is, at a temperature above about 40° F. Even further benefits are obtained, however, if the gas temperature at the entrance to the delinting drum 68 is in the range of from about 70° F. to about 125° F. The temperature of the drum 68 itself is maintained at about 145° F. in order to kill pink boll worm and other infestations.

Figure 2:
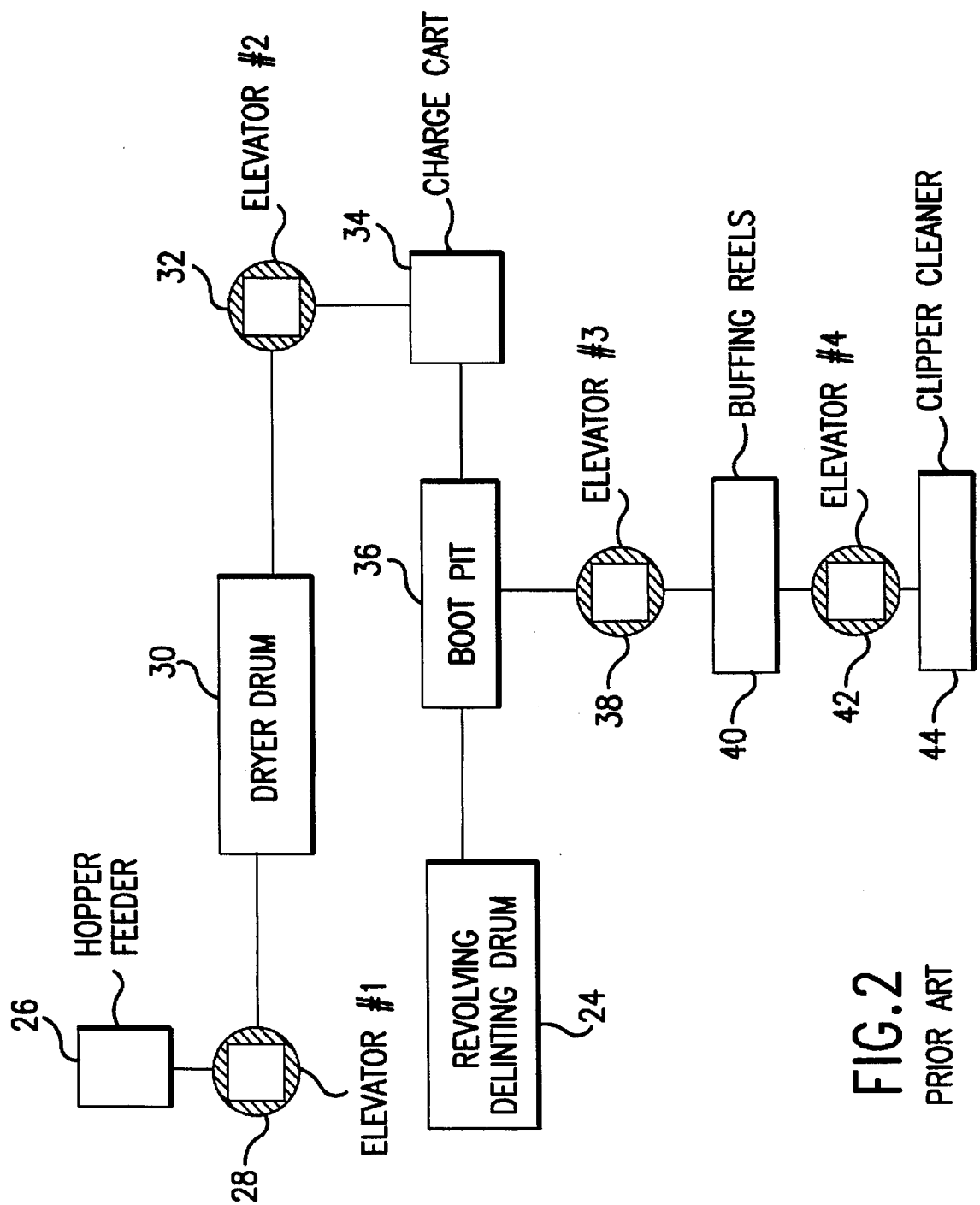
FIG. 2 is a flow diagram of the fuzzy seed delivery system of a prior art HCl cottonseed delinting system in which the HCl delivery system of FIG. 1 is utilized.

The fuzzy seed to be treated with HCl gas is delivered to the delinting drum 68 and removed therefrom in the same manner as shown in FIG. 2. Since the operating pressure in the drum 68 is at ambient pressure of one atmosphere, the combined pressure drop across the regulator valves 42 and 48 should be selected such that the pressure of the expanded gaseous phase exiting the valve 48 should be near or slightly above atmospheric pressure so as to accommodate the further flow of the gas through the system but, at the same time, to avoid any further substantial expansion and resultant temperature drop in the gas as it enters the atmospheric pressure operating environment of the drum 68. Thus, a pressure of the gas at the exit of the valve 48 of about one atmosphere but preferably no greater than about three atmospheres or about 50 psi is preferred and it has been found that a pressure at this point in the range of about 30 to 50 psi gives excellent results.

In the embodiment of the present invention shown in FIG. 3, the HCl gas thus enters the delinting drum 68 at a substantially higher temperature than in the case of the prior art system shown in FIG. 1. The present inventors have found that an increase in the temperature of the HCl gas entering the delinting drum 68 over that found to exist in the prior art systems very substantially and remarkably increases the chemical reaction rate and efficiency of the HCl gas with the lint on the fuzzy seed. With the system of the present invention as shown in the embodiment of FIG. 3, it was found that yields of treated seed per pound of HCl gas used were approximately doubled over those attainable with the prior art system of the type shown in FIG. 1. That is, in the prior art system as shown in FIG. 1, the amount of HCl required was typically in the range of 12 to 13.6 pounds of HCl per ton of fuzzy seed while in the present invention, the amount of HCl required has been measured to be in the range of about 6.53 to 7.83 pounds of HCl per ton of fuzzy seed.

In addition, it has been found that the HCl gas is virtually entirely consumed in the process and that when the delinting drum 68 is opened after the treatment cycle, there is no residual HCl gas remaining in the drum 68. Because of this, operating conditions are greatly further improved over the prior art systems and treatment of the lint and the seed with $NH_3$ after the seed is removed from the drum 68 is not required. The result is that, not only are yields greatly improved by being approximately doubled over the prior art, but working conditions are improved and corrosion of the equipment is virtually eliminated over prior art systems while, at the same time, a further cost reduction is attained by reason of the elimination of the need for neutralizing the treated seed and lint with $NH_3$.

The embodiment of the invention shown in FIG. 3 also has further advantages in that the purge valves which are placed on both sides of each major element of equipment in the system permit selected elements and the tubing 32 and 39 on both sides thereof to be isolated and residual HCl to be purged from the isolated element or elements and the adjacent tubing for purposes of maintaining and servicing the elements of the system and for bleeding moisture from the system without the risk of leakage of HCl gas. Thus the provision of the purge valves and their strategic location within the system on opposite sides of at least the key elements or those elements which require the most frequent regular maintenance provides important further advantages in further reducing maintenance costs as well as resulting corrosion damage to the equipment which occurs because of leakage of HCl gas and also interior moisture problems associated with maintenance in prior art systems.

It is to be understood that the embodiment of the present invention presented herein has been set forth in detail for the purpose of providing a full and clear disclosure of the present invention. Various changes and substitutions will occur to those skilled in the art, it being understood that the embodiments presented do not limit in any way the scope of the present invention as defined in the appended claims.

We claim:

1. A method of delinting fuzzy cottonseed using hydrogen chloride gas derived from a source in which hydrogen chloride is stored under high pressure comprising:

(a) removing said hydrogen chloride gas from said source under high pressure;
   (b) expanding said hydrogen chloride gas to reduce the pressure thereof;
   (c) heating said hydrogen chloride gas to a temperature substantially above 32° F.;
   (d) introducing said heated hydrogen chloride gas into a delinting reaction chamber along with cottonseed which is to be delinted without substantial further expansion of said gas which would cause a substantial reduction in the temperature thereof to less than 32° F.;
   (e) agitating said cottonseed and said hydrogen chloride gas within said reaction chamber to expose the lint on said seed to said hydrogen chloride gas and to hydrolyze said lint;
   (f) removing said seed from said drum and thereafter separating said hydrolyzed lint from said seed.

2. A method of delinting fuzzy cottonseed as set forth in claim 1 in which the temperature to which said hydrogen chloride gas is heated is above about 70° F.

3. A method of delinting fuzzy cottonseed as set forth in claim 1 in which the temperature to which said hydrogen chloride gas is heated is in the range of from about 70° F. to about 125° F.

4. A method of delinting fuzzy cottonseed as set forth in claim 1 in which the temperature to which said hydrogen chloride gas is heated produces a temperature substantially above 32° F. at the point of introduction of said gas into said delinting reaction chamber.

5. A method of delinting fuzzy cottonseed as set forth in claim 4 in which the temperature of said hydrogen chloride gas is in the range of from about 70° F. to about 125° F. at the point of introduction to said delinting reaction chamber.

6. Apparatus for delinting fuzzy cottonseed using hydrogen chloride gas derived from a source in which hydrogen chloride is stored under high pressure comprising:

(a) connecting means for connecting said apparatus to said source of hydrogen chloride under high pressure;
   (b) control means for controlling the flow of hydrogen chloride gas from said source and into said apparatus;
   (c) expansion means for expanding said hydrogen chloride gas to reduce the pressure thereof;
   (d) heat exchanger means for heating said hydrogen chloride gas after it has been expanded to reduce the pressure thereof;
   (e) reaction chamber means for reacting the lint on cottonseed to be delinted with hydrogen chloride gas;
   (f) means for introducing into said reaction chamber cottonseed which is to be delinted;
   (g) flow rate means for measuring the flow rate of said hydrogen chloride gas without substantial reduction of the pressure of said gas; and
   (h) means for introducing into said reaction chamber said hydrogen chloride gas after said gas has been heated in said heat exchanger and after the flow rate of said gas has been measured by said flow rate measuring means.

7. Apparatus for delinting fuzzy cottonseed as set forth in claim 6 further comprising:

tubing means interconnecting elements of said apparatus comprising at least said connecting means, said expansion means, said heat exchanger means and said flow rate means; and a plurality of purge valves positioned in said tubing means for externally venting said tubing and the elements of said apparatus positioned between selected pairs of said purge valves to allow purging of said apparatus of hydrogen chloride between said selected pairs of said purge valves.

8. Apparatus for delinting fuzzy cottonseed as set forth in claim 7 in which said tubing is formed of seamless stainless steel.

* * * * *